March 22, 1960

R. J. ZOELLER ET AL 2,929,341

METHOD FOR FORMING BISCUITS

Filed May 31, 1956

INVENTORS
RICHARD J. ZOELLER
DON R. TUCKER
HAMILTON W. PUTNAM
HENRY R. COOK
ROBERT O. BROWN
BY
Williamson, Schroeder, Adams & Meyers
ATTORNEYS March 22, 1960  R. J. ZOELLER ET AL  2,929,341
METHOD FOR FORMING BISCUITS
Filed May 31, 1956  2 Sheets-Sheet 2
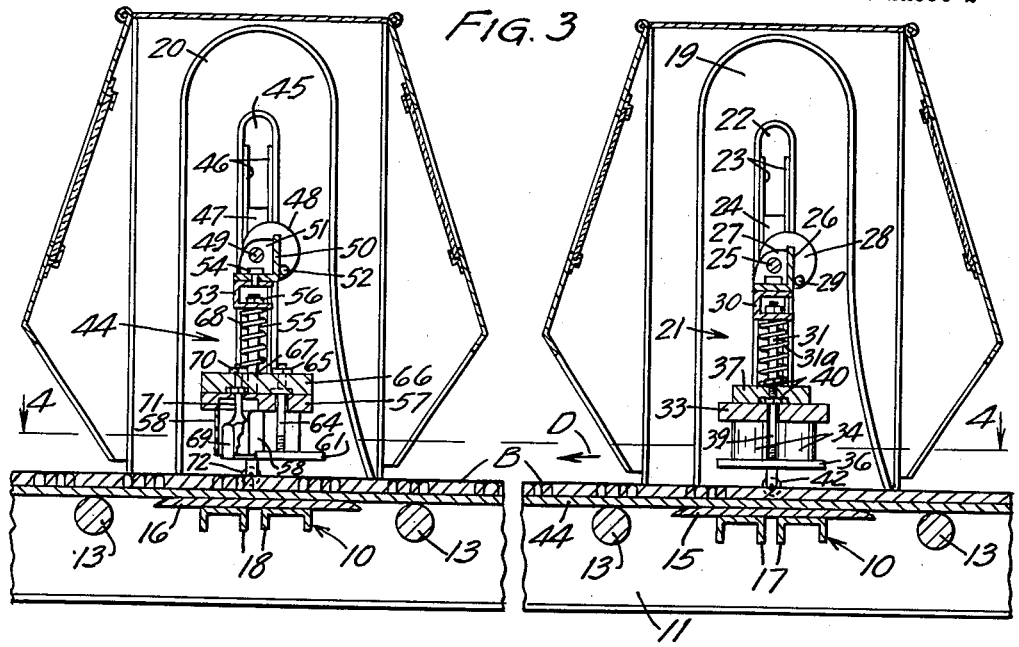
FIG. 3
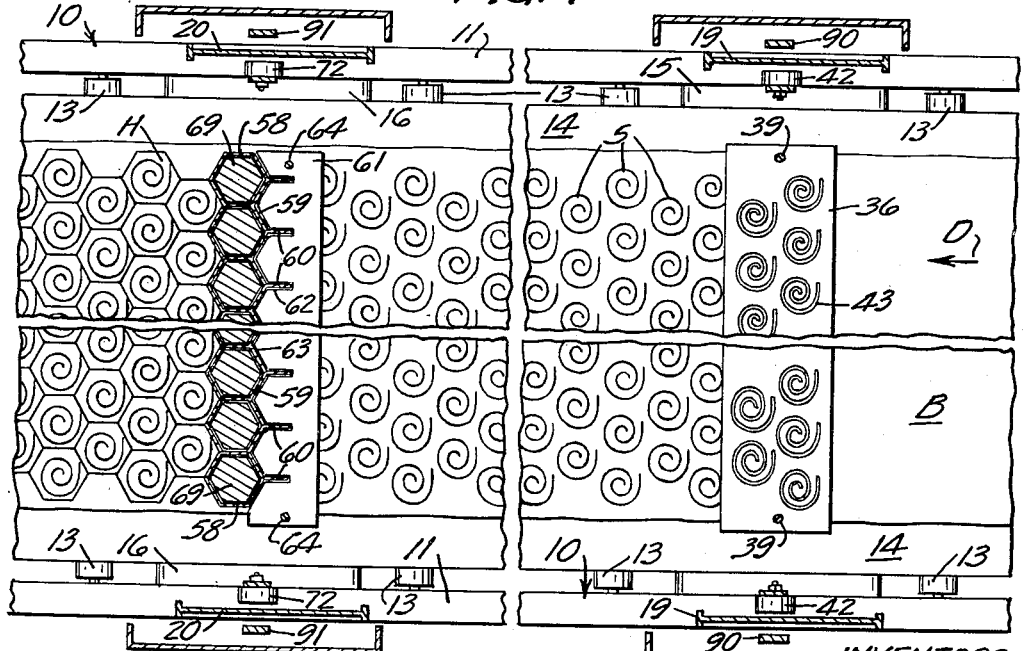
FIG. 4
FIG. 6
FIG. 5
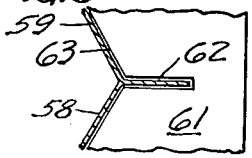
INVENTORS
RICHARD J. ZOELLER
DON R. TUCKER
HAMILTON W. PUTNAM
HENRY R. COOK
ROBERT O. BROWN
*Williamson, Schroeder, Adams & Meyers*
ATTORNEYS _United States Patent Office_  
2,929,341  
Patented Mar. 22, 1960

2,929,341

METHOD FOR FORMING BISCUITS

Richard J. Zoeller and Don R. Tucker, Louisville, Ky., Hamilton W. Putnam, Jeffersonville, Ind., Henry R. Cook, Denison, Tex., and Robert O. Brown, Minneapolis, Minn., assignors to The Pillsbury Company, a corporation of Delaware Application May 31, 1956, Serial No. 588,429

3 Claims. (Cl. 107—54)

This invention relates to a method of forming biscuits from a blanket of dough, and more particularly relates to such methods for forming biscuits which simulate in appearance rolls that are spirally wound.

Bakery products, such as cinnamon rolls which are normally formed by spirally winding elongated strips of dough, have been difficult to produce commercially and in large quantities in the past, because of the intricate manner in which they are formed. Another disadvantange in producing rolls in this manner is the high cost, which will be substantially prohibitive to the selling of such rolls for mass consumption.

With these comments in mind it is to the elimination of these and other disadvantages in the large quantity production of rolls that our invention is directed, along with the inclusion therein of other novel and desirable features.

Another object of our invention is the provision of a novel method in the art of forming "rolls" from a dough blanket and which consists in the steps of producing an open-ended spiral cut in the dough blanket and downwardly through the upper surface thereof and then cutting hexagonally through the dough blanket and around the spiral cut in such a manner that a portion of the hexagonal cut intersects the outer terminal end of the spiral cut.

These and other objects and advantages of my invention will more fully appear from the following description made in connection with the accompanying drawings wherein like reference characters refer to the same or similar parts throughout the several views, and in which:

Fig. 3 is a detail section view which is partly broken away and is taken longitudinally through the apparatus substantially on a vertical plane as indicated at 3—3 in Fig. 2;

Fig. 4 is a detail horizontal section view, partly broken away, and taken on a plane as indicated substantially at 4—4 of Fig. 3; and Figs. 5 and 6 are detail elevation views of portions of the clear plates shown in Fig. 4.

Figure 1:
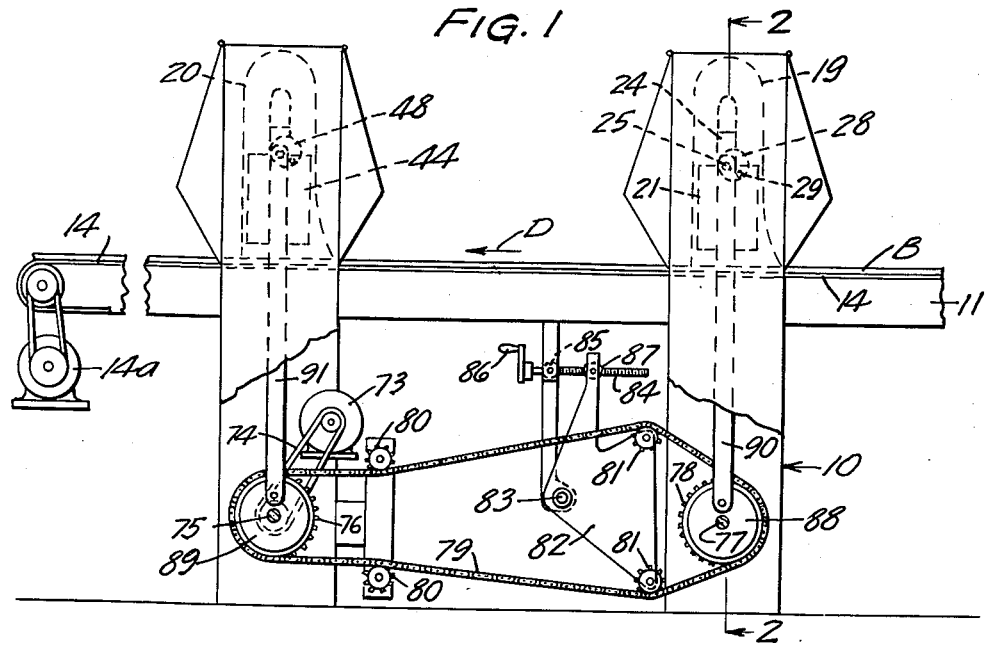
Fig. 1 is a side elevation view, partly broken away, of the entire apparatus.
Figure 2:
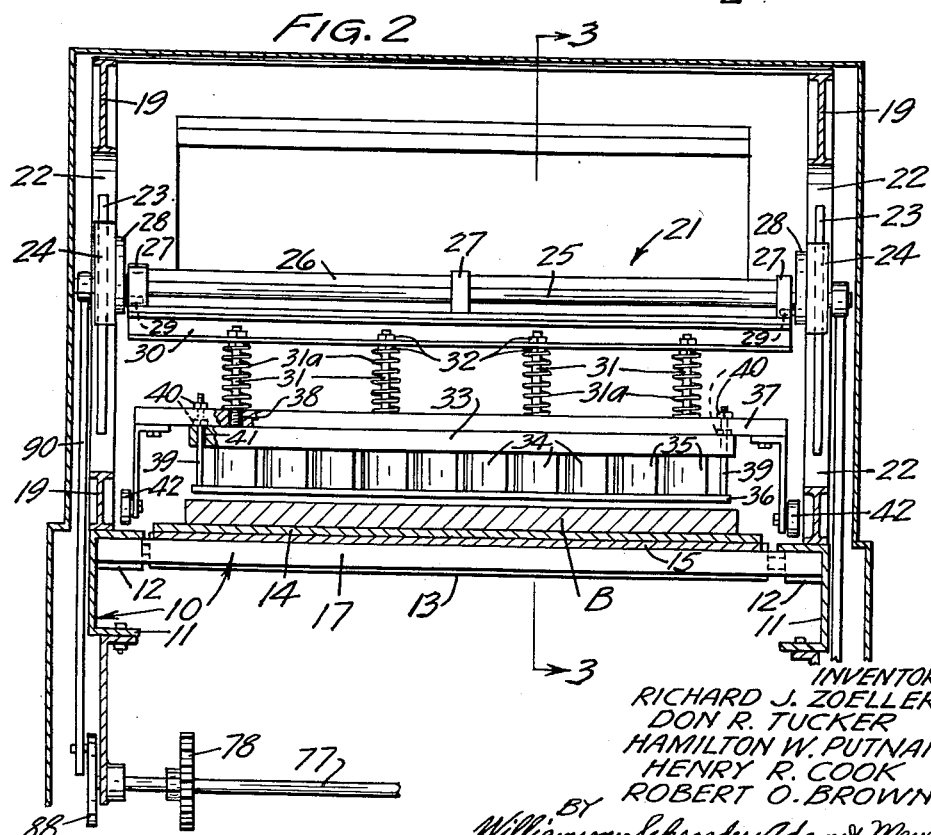
Fig. 2 is a detail section view taken transversely through the apparatus and substantially on a vertical plane as indicated at 2—2 in Fig. 1.

One form of the invention is shown in the accompanying drawings and is described herein. The biscuit-forming apparatus is provided with a frame indicated in general by numeral 10 having elongated side channels 11 upon which are mounted bearings 12 mounting support rollers 13. A dough blanket supporting conveyor comprising a belt 14 is carried on the rollers 13 and is moved continuously in the direction of arrow D by means of a suitable source of power such as motor 14a which may be supported on frame 10. The dough blanket indicated by letter B is supplied onto the conveyor 14 at the receiving end thereof and is carried along to be formed into biscuits. A pair of supports or stamping tables 15 and 16 may be suitably mounted on the frame and supported by cross pieces 17 and 18 respectively. On opposite sides of the conveyor 14 and adjacent the tables 15 and 16 are mounted upstanding frame pedestals 19 and 20.

An ornamental configuration impressing mechanism or spiral cutting mechanism is indicated in general by numeral 21 and is carried by the upstanding pedestals 19. The pedestals 19 have opposed and upright slot openings 22 formed therein and have guiding or track members 23 affixed in the openings 22. Slides 24 are carried between the track members 23 for vertical sliding movement. A shaft 25 extends through the slides 24 for vertical reciprocating movement therewith. A mounting 26, which in the form shown is constructed of angle iron, has bearings 27 affixed thereto which rotatably receive the shaft 25 therethrough to thereby swingably support the mounting 26 on the shaft. Means are provided for restricting swinging rotation of mounting 26 and in the form shown guiding discs 28 are affixed as by welding to the slides 24. The discs 28 engage the sides of track members 23 to hold the slides 24 within the upstanding pedestals 19. Each of the discs 28 has a stop element or lug 29 affixed thereto and engaging the mounting 26 to restrict counter-clockwise rotation thereof about the mounting shaft 25. A channel member 30 is affixed to the mounting 26 and has a plurality of depending rods 31 affixed thereto as by nuts 32. A mounting plate or platen 33 is affixed to the lower ends of rods 31 to be driven in vertical reciprocation by mounting 26. Platen 33 has a plurality of impression-forming elements or spiral cutters 34 affixed thereto in depending relation. As best seen in Fig. 5, the spiral cutters 34 are formed of stiff sheet material such as high carbon steel and are spirally wound about vertical axes. The spiral cutters 34 have open outer terminal end portions 35 which extend, in the form shown, generally transversely of the conveyor 14 and of the dough blanket. It will be seen that the spiral cutters 34 are arranged in two rows across the conveyor and the cutters in the several rows are staggered in relation to each other.

As best seen in Fig. 4 wherein the spiral cutters 34 have been removed for sake of clarity, the spiral cutting mechanism 21 includes a clear plate 36 which is normally disposed adjacent the lower cutting edge portions of cutters 34 and above the dough blanket B. A mounting member 37 has a plurality of bearing apertures 38 which slidably carry the rods 31 therein for supporting the mounting 37 on platen 33. Mounting 37 is affixed to clear plates 36 by bolts 39 which may be threaded into tapped holes in clear plate 36 and which are secured as by nuts 40 to mounting 37. Bolts or rods 39 extend through slide bearing apertures 41 in platen 33 to permit relative movement between platen 33 and clear plate 36 and to maintain the clear plate in predetermined relation to plate 33 and cutters 34. Mounting 37 is provided with stop rollers 42 at the opposite ends thereof which are normally disposed above portions of frame 10 for abutting the same when shifted downwardly.

Clear plate 36, as best seen in Figs. 4 and 5, is provided with a plurality of elongated and spirally disposed cutter-receiving guide openings 43 which are shaped identically to the configuration of the spiral cutters 34. Each of the spiral guide openings 43 is aligned with a respective spiral cutter 34 to receive and guide the same therethrough. Compression springs 31a are mounted in surrounding relation on rods 31 and bear against channel 30 and clear plate mounting 37 and are constructed to urge the same apart. Because channel 30 is affixed to platen 33, and mounting 37 is affixed to clear plate 36, the springs 31a react between the platen 33 and clear plate 36, and tend to urge the same apart.

It will be seen that the cutters 34 are supported from shaft 25 and are swingable about the axis of shaft 25. Normally the cutters 34 are disposed substantially normal to the plane of the dough blanket B. When the cutters are driven into the continuously moving dough blanket they are permitted to move slightly in the direction of movement of the blanket B, that is in the direction of arrow D, by virtue of the swingable mounting thereof. The scroll cutting mechanism 21 is so weighted, that it will swing back to the normal position and against lug 29 after the cutters 34 have been retracted out of the dough.

Means are also provided for cutting the peripheral outlines of biscuits in the dough blanket and in the form shown, such means include the biscuit cutting mechanism which is indicated in general by numeral 44. Biscuit cutting mechanism 44 is spaced along conveyor 14 and in the direction of movement of the conveyor from the spiral configuration cutting mechanism 21 and is constructed and arranged to cut biscuit outlines in concentric relation with respect to the spiral cuts formed in the dough blanket by mechanism 21. The biscuit cutting mechanism 44 is similar in construction to the spiral configuration impressing mechanism 21 and in the form shown, the upstandings frame pedestals 20 are provided with elongated and upright guide openings 45 which have track members or guides 46 affixed in opposed and spaced relation on the pedestals 20. Vertically reciprocable slides 47 are carried between the track members 46 and have guiding discs 48 affixed thereto. A mounting shaft 49 extends between the slides 47. Mounting or angle iron 50 is carried on shaft 49 by bearings 51 which are affixed to mounting 50 and rotatably carried on shaft 49. Stop elements or lugs 52 are affixed to discs 48 and engage the mounting 50 for restricting counter-clockwise swinging thereof, as seen in Fig. 3. Mounting 50 has a channel 53 affixed as by bolts 54 thereto and the channel 53 has a plurality of depending rods or posts 55 affixed thereto as by nuts 56. The lower ends of rods 55 are fixed to a cutter mounting platen 57. A plurality of hexagonal biscuit cutters 58 are fixed on platen 57 in depending relation. As best seen in Fig. 4, the hexagonal cutters 58 are integrally formed in a row extending across the conveyor belt and along the length of platen 57. Each of the hexagonal cutters has a section 59 thereof which extends diagonally or obliquely with respect to the direction of the conveyor movement. A plurality of cutting fins 60 are secured to the hexagonal cutters 58 for cutting an additional row of biscuits from the dough blanket. It will be seen that the cutters 58 and fins 60 cut only 4 sides of a hexagonal cut in the area between fins 60, and the remaining two sides of these hexagonal cuts will be formed in a subsequent downward cutting movement of the cutters after the dough blanket has moved along with the conveyor in the direction of arrow D.

A clear plate 61 has slot openings 62 therein to slidably receive and guide the cutting fins 60 and the leading edge portion 63 of clear plate 61 is formed to correspond to the external configuration of the hexagonal cutters 58. A plurality of mounting rods 64 are affixed to clear plate 61 as by being threaded into tapped holes. Mounting rods 64 are fixed as by nuts 65 to a clear plate mounting 66 which is normally carried on platen 57 and which is provided with slide apertures 67. The platen mounting posts 55 are slidably carried in the apertures 67 of mounting 66. Compression springs 68 are mounted on rods 55 and bear against the channel 53 and clear plate mounting 66, and tend to urge the same apart. Springs 68 thereby react between platen 57 and clear plate 61 and tend to urge the same apart. A plurality of clearing plungers 69 are fixed to the clear plate mounting 66 as by nuts 70 and have shaft portions 71 which extend through the platen 57 for vertical sliding movement therethrough. Clearing plungers 69 are mounted in the interior of hexagonal cutters 58 for holding the biscuits down on the conveyor after the same have been cut from the dough blanket. Stop rollers 72 are fixed to clear plate mounting 66 for restricting downward shifting movement thereof and of clear plate 61 and clearing plungers 69.

Means are provided for driving the scroll cutting mechanism 21 and the biscuit cutting mechanism 44 and for adjustably synchronizing the operation thereof. In the form shown, a source of rotary power such as motor 73 is carried by frame 10 and is drivably connected by a belt 74 to a drive shaft 75 which is suitably journalled in frame 10. Drive shaft 75 is disposed below the biscuit cutting mechanism 44. Another rotary shaft 77 is journalled in frame 10 below spiral cutting mechanism 21 and has a sprocket 78 keyed thereto. Means are provided for drivably interconnecting sprockets 76 and 78 and for adjusting the phase relationship of their respective cycles of operation with respect to each other. In the form shown, a roller chain 79 is trained around sprockets 76 and 78 and is guided by idler sprockets 80 which are suitably journalled on frame 10. Chain 79 is also carried by idler sprockets 81 which are journalled on a swingable mounting plate 82. Mounting plate 82 is swingable on a horizontal axis for adjusting the vertical positions of idler sprockets 81 and plate 82 is swingably mounted on a horizontal shaft 83. A threaded rotary shaft 84 is carried in a suitable bearing 85 which is mounted on frame 10, and shaft 84 has a hand crank 86 secured thereto be rotated thereby. A threaded bearing 87 mounted on plate 82 threadably receives the shaft 84 to be moved longitudinally therealong and to thereby swing plate 82 and sprockets 81 about shaft 83. Spiral cutting mechanism 21 and biscuit cutting mechanism 44 are drivably connected to shafts 77 and 75 respectively by Pitman oscillators which include eccentrics 88 and 89 to which are connected rods 90 and 91. Rods 90 and 91 are respectively connected at their upper ends to shafts 25 and 49.

*Operation*

In operation, the conveyor 14 is moved continuously to carry the dough blanket to the scroll cutting mechanism 21 and then the biscuit cutting mechanism 44. As the dough blanket approaches the spiral cutting mechanism 21, a small quantity of non-glutenous material such as rice flour may be spread over the top of the dough blanket. The motor 73, through eccentrics 88 and connecting rods 90 vertically reciprocate the mountings 26, cutters 34 and clear plate 36. As the mounting 26 moves downwardly, the cutters 34 and clear plate 36 move therewith until the stop rollers 42 engage the abutting portion of frame 10, whereupon clear plate 36 will be disposed in close proximity with the upper surface of the dough blanket and will be stopped. The mounting 26 continues to move downwardly, causing the springs 31a to be compressed and causing the cutters 34 to be driven into the dough blanket to form a plurality of spiral configurations indicated by letter S, as best seen in Fig. 4. The cutters 34 are driven only part way through the dough, as best seen in Fig. 3, so as to leave a continuous uncut portion adjacent the bottom surface of the dough blanket. The cutters 34 will thereafter be retracted from the dough as the eccentric 88 moves the mounting 26 upwardly again. When the cutters 34 again move upwardly, the springs 31a hold the clear plate 36 in close proximity with the upper surface of the dough blanket and hold the dough blanket down on the conveyor until the cutters 34 have been completely retracted from the dough. It will be seen that, by virtue of the configuration of the openings 43 in the clear plate 46 the dough is held downwardly by the clear plate on both sides of the cutters 34, that is, on the inner and outer sides of all portions of the cutters. This is particularly important in the cutting of the spiral configurations in the dough because if the dough should stick to any portion of one of the cutters, an elongated strip of dough may be pulled upwardly from the blanket, the strip being defined by the spiral cut and then straightened out by the upwardly moving cutters. The non-glutenous material which is spread over the top surface of the dough blanket is driven downwardly into the spiral cuts to prevent healing of these cuts and the spiral configuration will be preserved in the dough blanket.

The spiral cutters 34 quickly move downwardly into the dough blanket and then out again but this movement is not instantaneous and therefore the continuously moving dough blanket will move the cutters 34 slightly in the direction of arrow D as the cutters are being driven down into the blanket and retracted therefrom. The cutters 34 and the clear plate 36 will swing with their respective mountings in a clockwise direction as seen in Fig. 3 and substantially into the dotted position shown in Fig. 4 before they are again retracted upwardly. As the cutters 34 and clear plate 36 are retracted, they will again swing in a counterclockwise direction until the mounting 26 abuts against the lugs 29, whereupon the cutters 34 will again be disposed substantially normal to the dough blanket and are ready for projection thereinto again. The eccentric continues to vertically reciprocate the cutters 34 so as to form spiral configurations in the continuously moving dough blanket at regularly spaced intervals.

After the dough blanket has moved under the spiral cutting mechanism 21 it continues to move toward the biscuit cutting mechanism 44. The operation of the biscuit cutting mechanism is substantially identical to the operation of the scroll cutting mechanism 21. The cutters 58 and fins 60 are reciprocated into and through the dough blanket to form a plurality of individual hexagonally shaped biscuits. The operation of clear plate 61 is substantially identical to the operation of clear plate 36 and, in addition, the clearing plungers 69 operate in a fashion similar to the clear plate 61 for positively driving the biscuits out of the hexagonal cutters 58. The cutters 58 and fins 60 also move slightly with the continuously moving dough blanket and swing in a clockwise direction about shaft 49 and substantially into the dotted position thereof shown in Fig. 4. The hexagonal biscuit peripheries indicated by letter H cut in the dough blanket by cutters 58 are formed concentrically of the spiral cuts S. By adjusting the hand control 86, the phase relationship of cyclic reciprocation of the spiral cutters and the hexagonal cutters may be changed and by properly adjusting this phase relationship, the hexagonal cutters 58 will cut precisely concentrically of the spiral cuts S already formed in the dough blanket and moved under the hexagonal cutters. In addition, the outer terminal ends of the spiral cuts S, as formed by the terminal ends 35 of cutters 34, will intersect the hexagonal peripheries H cut by the cutters 58. The timing of the hexagonal cutters 58 may be adjusted so that the obliquely disposed portion 59 of each of the cutters 58 will intersect the outer terminal ends of the spiral cuts S. The dough blanket consists of a plurality of individual biscuits after having passed under the biscuit cutting mechanism 44 and the individual biscuits may then be removed from the conveyor by any suitable means such as manual operation.

The invention includes the method steps, in the art of producing biscuits from a blanket of dough which perceptably simulate rolls formed by spirally winding elongated strips of dough, consisting in forming of a plurality of open-ended spiral impressions or cuts part way through the thickness of a dough blanket and cutting hexagonal biscuit outlines completely through the dough concentrically of the spiral cuts or impressions formed therein, arranging the hexagonal biscuit-defining cuts in meshed or interfitting relation with each other and orienting the hexagonal cuts and the spiral cuts with respect to each other to cause the outer terminal ends of the spiral cuts to intersect the biscuit defining hexagonal cuts, and inserting a quantity of non-glutenous material into the cuts formed in the dough and thereby prevent healing of the cuts. It will be seen that to cause the spiral cuts to intersect the biscuit periphery causes the biscuit to close simulate in appearance rolls which are formed by spirally winding strips of dough. It will also be seen that by merely forming the spiral cuts part way through the dough, the biscuits will hold together securely to facilitate easy handling of the biscuits when formed. It will also be seen that the meshed or interfitting arrangement of the hexagonal cuts facilitates the maximum utilization of the dough in the forming of biscuits simulating rolls in appearance and the hexagonal configuration of the biscuit outline is not perceptably objectionable because the periphery of the biscuits will be somewhat rounded by natural contraction of the dough formed into biscuits.

It will be seen that we have provided new and improved methods of forming biscuits from a blanket of dough so that the biscuits simulate the appearance of spirally wound rolls and so that the biscuit dough after having been formed will retain the desired shape to facilitate ready and easy handling thereof.

It will, of course, be understood that various changes may be made in the form, details, arrangement and proportions of the parts without departing from the scope of my invention which generally stated consists in the matter set forth in the appended claims.

What we claim is:

1. In the art of producing from a blanket of dough, a biscuit which simulates a spirally wound roll in appearance, the method steps consisting in cutting the dough twice in separate steps, one cutting step including producing a spirally extending cut part way through the dough blanket from the upper surface thereof, the cut having an open outer terminal end, and the other cutting step including cutting completely through the dough and around said spirally extending cut and in intersecting relation with the open end thereof, whereby the biscuit formed is perceptibly different from a spirally wound roll only upon close observation.

2. In the art of producing from a blanket of dough, a plurality of biscuits which simulate in appearance spirally wound rolls, the method steps consisting in producing a plurality of spaced and spirally extending cuts having open outer terminal ends and being formed part way through the dough from the upper surface thereof, and cutting contiguous hexagonals completely through the dough and around the respective spirally extending cuts and with one side of each hexagonal intersecting the open terminal end of the corresponding spiral cut at an oblique angle, whereby a maximum number of biscuits are formed from the dough blanket which are perceptibly similar to spirally wound rolls.

3. In the art of producing from a blanket of dough, a biscuit which simulates a spirally wound roll in appearance, the method steps consisting in progressively moving the blanket of dough in one direction, cutting the dough twice in separate steps, one cutting step including formation of a spirally extending cut through the upper surface of the dough blanket and part way through the blanket, said spirally extending cut having an open outer terminal end, the other cutting step including cutting completely through the dough along a line oblique with respect to the direction of travel and in intersection with the open end of the spiral cut and thence completely around the spiral cut to define the biscuit periphery.

(References on following page)

References Cited in the file of this patent

UNITED STATES PATENTS

| | | |
|---|---|---|
| 978,440 | Engenhofer | Dec. 13, 1910 |
| 1,092,090 | Bugler | Mar. 31, 1914 |
| 1,746,521 | Broeg | Feb. 11, 1930 |
| 2,075,699 | Brennan | Mar. 30, 1937 |
| 2,263,490 | Fox | Nov. 18, 1941 |
| 2,617,370 | Martka | Nov. 11, 1952 |
| 2,623,479 | Clinton | Dec. 30, 1952 |